Patented June 7, 1938

2,120,044

UNITED STATES PATENT OFFICE 2,120,044

METHOD OF PRODUCING QUICK DRYING OIL SUITABLE FOR VARNISHES

Julius L. Schneider, Sylvester Leon Flugge, and Raymond J. Evans, Chicago, Ill., assignors to Continental Can Company, Inc., New York, N. Y., a corporation of New York No Drawing. Application March 12, 1934, Serial No. 715,248

1 Claim. (Cl. 87—12)

It has heretofore been the practice to produce quick drying oils by heating the raw material in an open kettle, either with or without a catalyst. Many oils cannot be heated to a very high temperature under such conditions, as they are inclined to darken greatly in color and to jelly suddenly. Further, the resulting oil still requires a considerable time for drying and usually is baked by heating to a fairly high temperature for accelerating the "drying". In many instances, however, it is undesirable to use a high temperature for accelerating the drying: for example, when the varnish is employed as an enamel for a tin can, the temperature must not be high enough to produce a fusion of the solder employed in forming the can. Since the solder normally employed melts at below 400 degrees F., and begins to weaken at around 225 degrees F., it is essential that the baking temperature be maintained below this point. A longer period of heating is required as the temperature is lowered below 400 degrees F., in order to attain the proper drying of such a varnish under these conditions. To this end, however, it is necessary to provide a large stove space for the heating, and the operation becomes expensive by reason of the equipment demanded and the quantity of stock undergoing treatment.

It has, however, been found, according to the present invention, that it is possible to treat an oil for bodying the same by heating it under increased pressure. As a result the objectionable jellying is avoided, the time of drying is reduced, and the temperature necessary for an economical period of drying becomes less than 400 degrees F. In particular, it has been found that this effect is augmented in the presence of a catalyst of oxidizing nature, that is, it is capable of effecting a substitution or replacement of hydrogen in the molecule. Such a catalyst may be, for example, fuming nitric acid, gaseous chlorine, gaseous oxygen, or the metallic driers such as lead or manganese oxide, lead resinate, etc. Further, if the pressure is maintained by carbon dioxide gas or nitrogen, a bodying occurs, and in practice it is found that the carbon dioxide is even more favorable than the nitrogen. If a dark-colored varnish is undesirable for a particular employment, it is possible to prevent darkening by appropriate selection of the conditions of treatment.

These effects can be obtained by a batch process by placing the raw oil in a closed container and subjecting it to a pressure up to 2100 pounds or more, and to a temperature of from 400 to 1000 degrees F., but short of the carbonizing or cracking point of the particular oil.

This treatment of the varnish oils leads to an effective bodying of the same so that rapid drying occurs. While the process is applicable to various varnish oils, it has been found especially valuable with China-wood oil, as the aforesaid catalysts then operate to effect a bodying by polymerization of the oil without the sudden jellying and leave the treated oil in such a condition that the drying by oxidation and further polymerization upon exposure to air and/or heating is immediate, and an excellent varnish film may be obtained therefrom.

Since the raw oil and the catalyst may be mixed to produce a fluid of substantially homogeneous nature, the procedure is excellently adapted for continuous practicing, by passing the oil under pressure through a coil heated to the required temperature.

As a specific example of practicing this procedure, China-wood oil is saturated at room temperature and pressure with carbon dioxide gas by bubbling the carbon dioxide from a pressure cylinder into the oil. So long as absorption occurs, the bubbling is continued; upon stopping the bubbling, if gas is evolved very rapidly from the oil, the intended saturation point has been reached. The saturated oil is then passed under pressure through about twelve feet of coiled iron pipe of $\frac{3}{32}$" inside diameter, this pipe being heated in a molten lead bath at 700 degrees F. The pressure was maintained sufficient to effect a passage at the rate of approximately four ounces per minute, the oil leaving the coil at 600 degrees F. The pressure effect may be controlled by regulating the outlet orifice from the coil. The orifice was of such dimension, in the particular case, that a pressure of around 1000 pounds per square inch was employed at the inlet side. As a result of this treatment, the frosting and checking tendencies of China-wood oil were eliminated and the iodine value reduced from 155-160 to 100-120. The viscosity was but slightly increased while the color remained substantially unchanged. In some instances with such use of the carbon dioxide as a catalyst, the color was lightened.

Corresponding results of polymerization may be accomplished, with the same apparatus and procedure, by employing about three percent of fuming nitric acid, in proportion to the China-wood oil, the acid having been previously dissolved to substantial saturation in a solvent such as acetone at 32 degrees F. A proportion of about one-half of one percent of chlorine leads to a like result. Saturation of the raw oil itself at room temperature and pressure by dissolving gaseous oxygen or nitrogen therein as a physical solution gives a similar result. It is possible also to employ materials which are normally solids: thus one percent of manganese resinate is employable, and other drying agents are capable of utilization.

The relative time of treatment in the above specific example was determined by the relationship of pressure, coil friction and orifice resistance. It is therefore possible to vary the relative time by varying the length of the coil, the pressure and the orifice in respect to one another; and thus the operator is enabled to employ the desired pressure and time which has been found most suitable for the product to be made. The treatment should not be carried to the point of deleterious cracking or carbonization.

The procedure is adapted to employment with other than Chinawood oils, as linseed oil and other drying oils are highly benefited as to drying capacity by a similar treatment. It will be found, however, that longer relative times are required for linseed oil than for Chinawood oil to attain a given degree of effect.

Furthermore, it is possible to subject a varnish blend to the procedure. Thus, for example, a heat-convertible resin of the phenol-formaldehyde or like condensation type (sometimes denominated an alkyd resin) may be dissolved in a blown oil (such as soya bean oil) at a temperature below 250 degrees F., and the liquid subjected to the pressure polymerization treatment. The product is a quick-drying varnish having the combined properties of a Chinawood oil varnish and a condensate-resin varnish. It is noteworthy that this combination cannot be made by heating in the open varnish kettle over fire because of the extreme sensitivity of both constituents to gelation. A similar combination can be made from a phthalic condensate resin and cottonseed pitch.

In general, it has been found that the oils subjected to pressure-polymerization treatment in the presence of carbon dioxide suffer little or no darkening. In some instances, the color is lighter after treatment than before. Oxygen and nitrogen gases apparently cause a darkening of the color, but the darkening is far less than with a kettle-bodied oil. This darkening effect is still less if the vessel or coil be made of aluminum or copper, rather than of iron. The fuming nitric acid and chlorine produce very dark bodied oils of deep mahogany or greenish black color.

It has further been found that upon bodying oils under pressure and at the higher ranges of temperature, such as 700 degrees F. or more, the oils dry differently than kettle-bodied oils; while with use of relatively lower temperatures such as 400 degrees F., with a very rapid passage through the treating zone of a coil, for example, the drying action of the bodied oil more resembles that of kettle-bodied oil.

A comparison of raw oil, kettle-bodied oil, and pressure-polymerized oil is shown in the following table where (1) is raw oil; (2) oil bodied in an open aluminum kettle at 520 degrees F.; (3) oil bodied in an open aluminum kettle at 560 degrees F.; (4) oil after pressure polymerization at 1500 pounds of nitrogen gas pressure at 600 degrees F.; (5) oil after pressure polymerization under 1900 pounds of nitrogen gas pressure at 600 degrees F.

| Specimen | Iodine value (Wijs) | Acid number | Saponification number |
|---|---|---|---|
| 1 | 164 | 5.0 | 199.4 |
| 2 | 137 | 4.9 | 199.5 |
| 3 | 134 | 4.7 | 199.0 |
| 4 | 117 | 10.2 | 190.7 |
| 5 | 114 | 9.3 | 195.6 |

Physically, the pressure polymerized oil is characterized in its substantial freedom from gel spots or "seeds"; its ability to bake out flavor-free more rapidly and at lower baking temperatures than the kettle-bodied oil; and its low viscosity, whereby it is suitable even for use as a vehicle in outside paints.

The treatment may be continued for a desired period of time, according to the characteristic to be imparted to the varnish oil. This time of treatment is coordinated with the pressure and temperature and the catalyst, if any, which is employed, so that it is not continued until jellying of the oil results, with the attendant difficulties of properly applying the material as an enamel. At all events, it is interrupted prior to carbonization of the oil. Both the jellying and carbonizing effects appear to be limited or prevented by the pressure employed, so that higher temperatures are available with correspondingly shorter times of bodying treatment than has heretofore been possible while cooking in open kettles, and supervision and control of the bodying operation is far simpler.

The preferred temperature of treatment of the oil is in excess of 500 degrees F., for example, being that produced by the passage of oil through a coil located in a molten lead bath at 700 degrees F., so that the temperature approximates that of the coil. The pressures employed have varied from a few ounces to over two thousand pounds per square inch. The preferable pressure, however, is in excess of 100 pounds per square inch, as such a pressure produces a definite inhibition upon the gelation of the oil undergoing heat treatment for bodying. It is found that relative increases of pressure lead to improved results, particularly with the higher temperatures.

It is obvious that the invention is not limited to the particular example set forth, but that it may be employed in many ways within the scope of the appended claim.

Having thus described the invention, what we claim as new and desire to secure by Letters Patent, is:

The method of bodying a drying varnish oil which comprises dissolving carbon dioxide in the oil to saturation at atmospheric temperature and pressure, forcing the oil under a pressure of substantially 1000 pounds per square inch into and through a conduit heated to a temperature of 500 to 700 degrees F., and effecting the escape of the heated oil from the conduit prior to deleterious carbonization of the oil.

JULIUS L. SCHNEIDER.
S. LEON FLUGGE.
RAYMOND J. EVANS.